Aug. 15, 1967 R. K. KISER 3,335,753
CONTROL VALVE WITH ADJUSTABLE FLOW RATE, ESPECIALLY
FOR DISPENSING MACHINES
Filed March 2, 1964
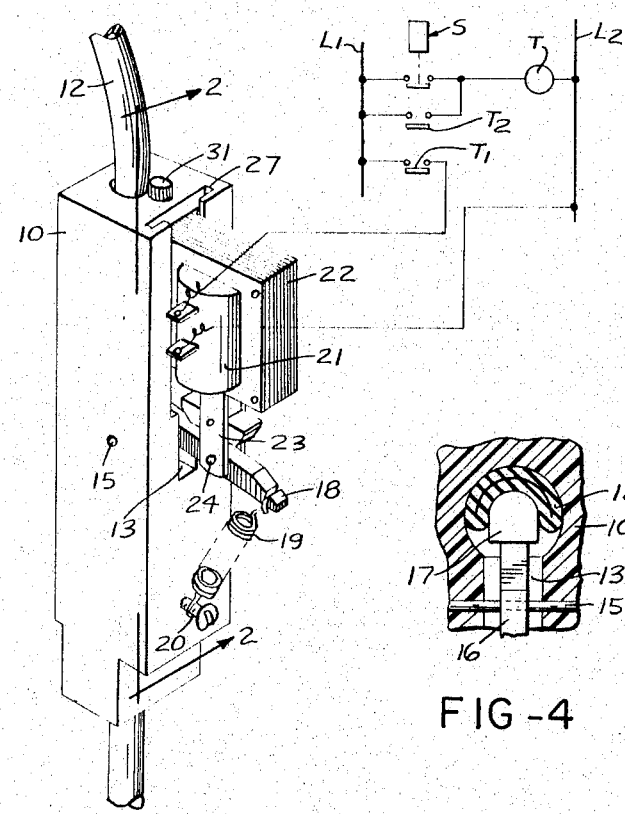
FIG-1
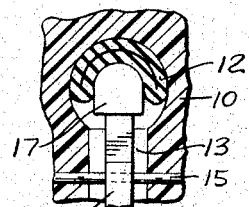
FIG-4
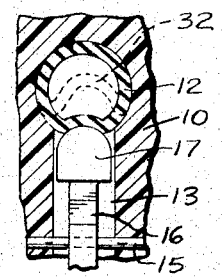
FIG-5
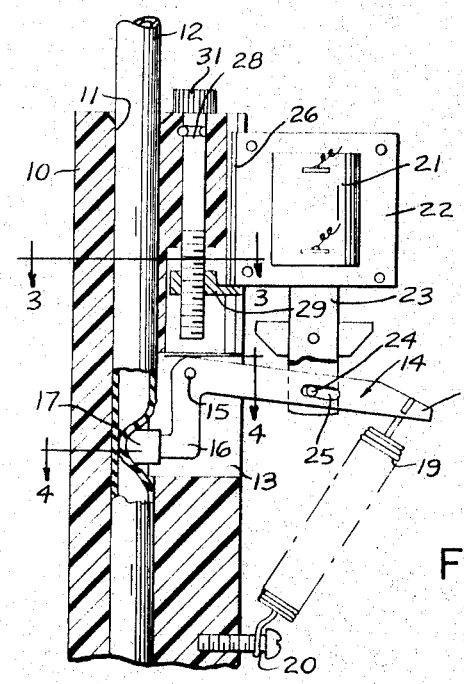
FIG-2
FIG-3
INVENTOR.
RICHARD K. KISER
BY

United States Patent Office 3,335,753
Patented Aug. 15, 1967

3,335,753
CONTROL VALVE WITH ADJUSTABLE FLOW RATE, ESPECIALLY FOR DISPENSING MACHINES
Richard K. Kiser, Bellbrook, Ohio, assignor to Kiser-Ohlmann, Inc., Dayton, Ohio, a corporation of Ohio
Filed Mar. 2, 1964, Ser. No. 348,717
5 Claims. (Cl. 137—624.11)

This invention relates to a control valve arrangement and particularly to a control valve arrangement for a device such as a beverage dispenser.

In the operation of beverage dispensers complete control of the liquid is important, and also sanitary conditions must be maintained and the valve structure must be of such a nature that it can be easily cleaned.

Heretofore, valves with moving valve members to interrupt the flow of the fluid have been employed but these valves tend to leak and require careful machining and are expensive. In other cases, devices have been provided for pinching off flexible tubes but, heretofore, the pinching off of the tube has been of such a nature as to tend to kink the tube and reduce its life.

The present invention is concerned with a valve arrangement of the last mentioned type.

An object of this invention is the provision of a valve arrangement wherein a tube is pinched off for controlling fluid flow but wherein the tube is not kinked to the point that the life thereof is reduced.

Another object of this invention is the provision of a control valve which pinches off a tube to stop the fluid flow therethrough and which is adjustable for varying the amount that the tube opens to control the rate of fluid flow through the valve when the tube is open.

Another object of this invention is the combination of a valve of the nature referred to with a timer control therefor so that the total quantity of fluid passing through the valve when it is open can be controlled.

The foregoing objects, as well as other objects, and advantages of the present invention will become more apparent on reference to the following description taken in connection with the accompanying drawings, in which:

FIGURE 1 is a perspective view showing a valve according to the present invention and an electrical control circuit associated therewith.

FIGURE 2 is a vertical transverse section indicated by line 2—2 on FIGURE 1.

FIGURE 3 is a plan sectional view indicated by line 3—3 on FIGURE 2.

FIGURE 4 is another plan sectional view indicated by line 4—4 on FIGURE 2 and showing the valve closed.

FIGURE 5 is a view like FIGURE 4 but showing the valve opened.

Referring to the drawings somewhat more in detail, the valve arrangement comprises a block 10 having a bore 11 therethrough through which is inserted flexible rubber like tubing 12 which is quite soft and pliable such as surgical tubing.

Between the ends of the block 10 is an opening 13 giving access to one side of the tubing 12. A lever 14 is pivoted at 15 in this opening and comprises an arm 16 having a rounded member 17 mounted on the free end thereof.

Lever 14 also comprises an arm 18 projecting outwardly from the block 10 and engaged by one end of a spring 19 anchored at its opposite end at 20 on block 10.

When lever 14 is released to the influence of spring 19, the lever rotates in a clock-wise direction as viewed in FIGURE 2 and this drives member 17 into tube 12 to close the tube as indicated in FIGURE 4 to prevent any fluid from passing therethrough.

Opening of the valve is accomplished by an actuator which is shown as a solenoid 21 mounted on a frame 22 and acting upon an armature 23 connected to arm 18 of lever 14 by pin 24 slidable in a slot 25 of the said arm 18.

The frame 22 of the actuator has side plates terminating in flanges 26 slidable in slot means 27 provided in block 10. The position of the frame 22 on the block is adjustable by a threaded screw 28 extending into the block 10 and engaging a nut like member 29 which abuts the bottom of the frame 22 of the actuator. Member 29 is disposed in a rectangular recess 30 in block 10 and, therefore, does not rotate so that rotation of screw 28 as by the knurled head 31, or by a wrench, will raise or lower said abutment member 29 thereby respectively raising frame 22 or permitting it to slide down in conformity with the downward adjustment of member 29.

The adjustment of the frame 22 will determine the mount of movement of lever 14 when solenoid 21 is energized to attract armature 23 and this will, in turn, determine the amount of movement of member 17 away from tube 12 and thereby determine the effective area of tube 12 when the valve is open.

In FIGURE 5 member 17 is shown in open position with tube 12 substantially completely open. The dotted line position shown at 32 represents the tube in partially opened position which can be accomplished by adjustment of the frame 22 downwardly on block 10.

For controlling the energization of solenoid 21 it may be connected in circuit between lines L1 and L2 as shown in FIGURE 1 in series with a timer blade T1 of timer T. Timer T is adapted to be energized by a switch arrangement S which may be a coin operated switch or the like. The timing blade T2 provides a holding circuit for the timer so that the duration of the period of energization of the timer T and, therefore, of solenoid 21 can be determined. By adjustment of timer T and adjustment of screw 28, the rate of fluid flow through tube 12 and the total quantity of fluid passing therethrough can be adjusted.

The tube 12 is easily removable from block 10 if this should become necessary. Thus, if the flexible tube 12 is to be withdrawn from block 10 for instance for cleaning purposes, it is merely necessary manually to slide solenoid 21 upwardly whereby lever arm 16 automatically moves out of the range of tube 12, and then manually to pull tube 12 out of the block. The reinsertion of tube 12 is done in an analogous way. Since the valve is also in its maximum flowthrough condition somewhat pinched by lever arm 16 (see FIG. 5), there is no fitting necessary for tube 12 in bore 11, so that once tube 12 is disengaged from lever arm 16, it can easily be slipped out and in.

It will thus be evident from the above that in a simple and fast manner and without any additional disassembly and re-assembly work, applicant's tube 12 can be withdrawn from and reinserted into the block 10, and this can be done without in any way affecting the previous setting of the valve as will now be set forth. Since the adjustment of the valve is also very simple, the described arrangement lends itself well to being manufactured inexpensively and being readily serviced, while maintaining completely sanitary conditions at all times.

As will be seen from FIGURES 4 and 5, the tubing is not pinched off flat as is the case when it is gripped by two flat members from opposite sides, and thus the tubing has long life in a valve according to the present invention.

It will be understood that other actuating devices such as eccentric cams and the like could be employed for actuating lever 14, or this device could be actuated manually, and the advantages pertaining to long life of the tube and the simplicity of the valve mechanism and the sanitary conditions maintained thereby would remain.

It will be understood that this invention is susceptible to modification in order to adapt it to different usages and conditions; and accordingly, it is desired to comprehend such modifications within this invention as may fall within the scope of the appended claims.

I claim:

1. A control valve which includes: a block having a bore therethrough, a flexible pinchable elastic tube extending through said bore, said block having an opening provided at one side of said block and intersecting said bore, pinching lever means pivoted to said block and having a first portion thereof extending through said opening and being engageable with said tube, said first portion being movable between a position in which said tube is collapsed and arrests flow therethrough and a position in which said first portion is completely disengaged from said tube, spring means continuously urging said first portion of said lever means to pinch said tube substantially closed, solenoid means slidably mounted on said block along the plane of the pivotal movement of said lever means, said solenoid means including armature means pivotally connected to a second portion of said lever means and operable when energized against the thrust of said spring means to reduce the pinching of said tube from a pinched closed condition to a desired and variable partially open condition, and adjustable setting means arranged in said block outside the path of said tube and operable from the outside of said block for preventing sliding movement of said solenoid means on said block toward said opening beyond a desired set limit while providing for sliding of said solenoid means manually on said block away from said opening in the direction of armature movement effecting opening of said tube by a distance sufficient to cause said first portion of said lever means to completely disengage said tube.

2. A valve according to claim 1, in which said pinching lever means is a two-arm lever pivoted within said opening and having its first portion formed by one of the two arms of said lever and having its second portion formed by the other one of said two arms.

3. A valve according to claim 1, in which said block is provided with slot means extending substantially parallel to said bore, and in which said solenoid means includes means slidably engaging said slot means.

4. A valve according to claim 3, in which said block has recess means adjacent said solenoid means, and in which said adjustable setting means includes a threaded bolt operable from the outside of said block and extending through said block into said recess means in a direction substantially parallel to said slot means, said adjustable setting means also including abutment means threadedly and adjustably engaged by said bolt and extending between said lever means and said solenoid means for normally abutting the latter.

5. A valve according to claim 1, which includes timing means electrically connectable to said solenoid means and operable to energize the latter for a desired period of time.

References Cited
UNITED STATES PATENTS

| | | | |
|---|---|---|---|
| 729,423 | 5/1903 | Scheiber et al. | 251—7 X |
| 1,346,948 | 7/1920 | Freedman | 251—9 X |
| 2,786,608 | 3/1957 | Brown | 251—7 X |
| 2,841,357 | 7/1958 | Little | 251—6 |
| 2,955,726 | 10/1960 | Feldman et al. | 251—7 X |

WILLIAM F. O'DEA, *Primary Examiner.*

R. GERARD, *Assistant Examiner.*